March 22, 1966  S. DE LUCIA  3,242,055
PROCESS AND COMPOSITION FOR ENHANCING BACTERIAL ACTION ON
SEPTIC TANKS AND THE LIKE, AND METHOD OF MAKING
SAID COMPOSITION
Filed July 10, 1962
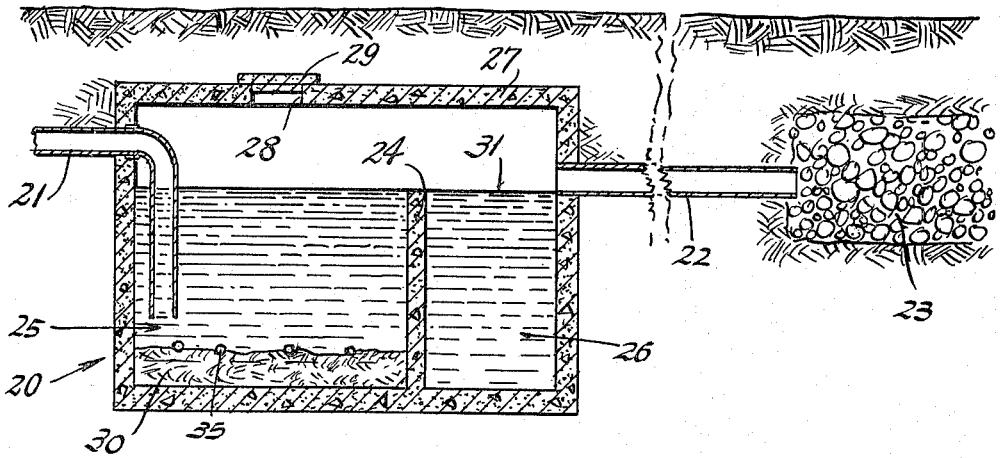
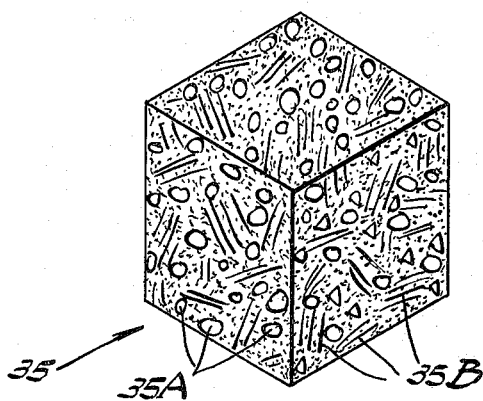
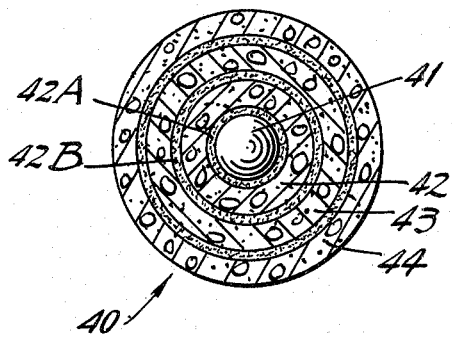
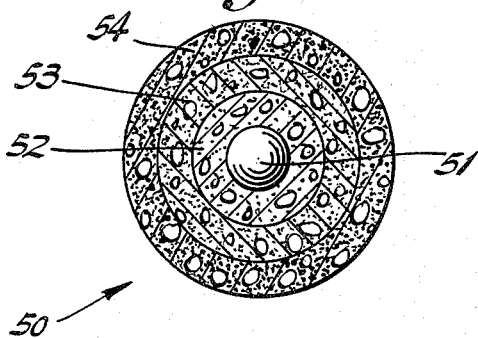
INVENTOR.
SANTO DE LUCIA
BY
Arthur T. Fattibene
ATTORNEY

United States Patent Office 3,242,055
Patented Mar. 22, 1966

3,242,055
PROCESS AND COMPOSITION FOR ENHANCING BACTERIAL ACTION ON SEPTIC TANKS AND THE LIKE, AND METHOD OF MAKING SAID COMPOSITION
Santo De Lucia, 41 Dogingtown Road, Newtown, Conn.
Filed July 10, 1962, Ser. No. 208,891
19 Claims. (Cl. 195—63)

This invention relates in general to a process and composition for enhancing bacterial action in septic tanks and method of making said composition, and more specifically to a weighted enzyme pellet construction and method of making the same, and to a particular method of application thereof to septic tanks, Inhoff tanks, cesspools and the like to insure both immediate and long lasting active bacterial action.

A problem of particular concern encountered in septic tank type installations and the like for handling and dispensing domestic sewage and waste is that of clogging. When such clogging occurs, the efficiency of the septic tank is materially reduced, and if permitted, would eventually result in pollution of the area. Generally clogging is the direct result of an incomplete septic action within the tank. When the septic action is incomplete, coarse particles of waste are carried out with the effluent material into the leaching fields and surrounding soil in the drainage area of such tanks. In time these coarse particles would clog the pores of the leaching fields and surrounding grounds. If this occurred, the free percolation of the sewage liquid and effluent is disrupted to the extent that satisfactory operation of the sewage unit is not possible.

Since satisfactory decomposition of the organic solids and waste in septic tanks and the like is affected by anaerobic bacterial action, it has become common practice with septic tank users to periodically deposit in the drains and waste pipes feeding into the septic tank enzyme containing materials to enhance the bacterial action within the tank; and in this manner assure satisfactory decomposition of the waste material and minimization of one of the major causes of clogging.

Heretofore, the enzyme containing materials, which the users of septic tanks have been customarily employing to enhance the bacterial action, have been in either liquid or powder form. Due to their inherent physical characteristics, these, heretofore, used liquid or powder forms of enzyme containing materials would quickly go into solution with the liquid in the tank. For this reason very little of the enzymes would reach or come into direct contact with the sludge accumulated at the bottom of the tank where the active bacterial action is most desired and required for maximum decomposition of the solid waste. Because the liquid and powder forms of enzyme material went quickly into solution was of further disadvantage for the reason that such enzymes were quickly flushed out of the tank with the effluent each time new sewage or waste was introduced into the tank. For this reason the powder or liquid enzyme additives within the tank became rapidly diluted and wasted before they could be totally utilized. Therefore, the enzyme additives of the liquid or powder forms actually have been and are of little value as they are relatively ineffective for enhancing the bacterial action for the above reasons.

Therefore, an object of this invention is to provide an improved enzyme construction for obviating the disadvantages inherent with either the liquid or powder form of enzyme containing materials.

Another object is to provide an enzyme additive in a form which assures that the enzyme material sinks to the bottom of the tank so as to lodge in the sludge where active bacterial action is most desired.

Another object is to provide an enzyme additive in a form which prohibits the flushing of the enzyme additive out of the tank before it has been utilized each time a new supply of waste is introduced into the tank.

Still another object is to provide an improved method of enhancing the bacterial action in a septic tank.

Still another object is to provide an improved enzyme pellet construction and method of making the same.

Still another object is to provide an enzyme pellet construction arranged to dissolve at variable rates so as to provide immediate and lasting bacterial action.

Other features and advantages will become more readily apparent when considered in view of the drawings and descriptions in which:

FIG. 1 is a sectional elevation view of a septic tank illustrating the enzyme pellets of this invention in operation.

FIG. 2 is a perspective view of an enzyme pellet construction of this invention.

FIG. 3 is a modified enzyme pellet construction of this invention.

FIG. 4 is still another modified enzyme pellet construction of this invention.

Referring to the drawings, there is shown a typical septic tank installation for the treating and disposing of domestic sewage and waste. In general such septic tanks comprise an enclosure or tank 20 having an inlet waste pipe or conduit 21 through which sewage and waste is discharged into the tank. In the opposite end of the tank 20 there is provided an outlet duct or pipe 22 through which the effluent material or liquid is discharged to a suitable leaching or draining field 23. Generally between the ends of the tank 20 there is disposed a baffle or wall 24 to partition the tank into a sludge digesting chamber 25 and an effluent receiving or flow through chamber 26. The top 27 of the tank is provided with an opening 28 by which access may be had to effect periodical cleaning. A removable closure 29 caps the opening.

In normal operation of the tank 20, sewage and waste is discharged from pipe 21 to the digesting chamber 25 wherein the heavier solids settle to the bottom of the chamber as sludge 30 whereas the lighter solids rise to the top. The septic process is further carried on by the anaerobic bacterial action. With proper bacterial action occurring the solids which collect as sludge 30 on the bottom of compartment 25 are disintegrated, the coarse matter being transformed into finely divided particles. This action converts a portion of the organic solids into gases or into soluble substances which pass out of the tank as dissolved in the effluent through conduit 22.

Normally the level 31 of liquid in the tank is disposed immediately below or at the level of the discharge conduit 22. Therefore, each time an amount of waste or sewage is introduced into the tank through inlet 21, a substantially equal volume is displaced and discharged through conduit 22. In order to enhance the bacterial action within the tank, it is customary to periodically introduce enzyme containing material into the tank. Heretofore, such enzyme additives were either liquid or powder in form. Since they would go immediately in solution, it has been observed that a portion of such enzymes in solution are flushed out of the tank each time a new supply of sewage was introduced into the tank. By this process it will be apparent that the enzymes in solution are rapidly diluted an flushed out of the tank before they have had a chance to activate the bacterial action. Thus, enzyme additives in these forms were rendered relatively ineffective.

In accordance with this invention an improved enzyme additive form is provided for obviating the inherent disadvantages of either the liquid or powder type of enzyme additive. The enzyme additive of this invention is constructed as a pellet. As shown in FIG. 2, the pellet 35 comprises a blend of powder or crystalline type enzyme material 35A, e.g. lipase, trypsin, amylase, pepsin or the like, and metallic filings 35B that are bonded together by a suitable binding agent, e.e. animal glue, animal glue mixed with skimmed milk, casein glue, or any suitable water soluble glue or binder non-reactive to the enzymes. The pellets 35 are sized and shaped so that they can be readily passed through the soil pipes leading to tank 20. The purpose of the metal filings, e.g. iron filings, is to weight the pellet 35. Thus, as the pellet 35 is introduced into the tank, it will immediately sink to the bottom of the tank and come to rest in direct contact with the sludge 30 where active bacterial action is most desired.

In accordance with this invention, the pellet 35 is constructed to dissolve either at a relative rapid rate, or more slowly depending upon the nature of the binding agent employed therein. For example, if animal glue is used as a binding agent for the blend of filings 35B and enzyme material 35A, the pellet 35 will dissolve at a relative rapid rate. If animal glue mixed with skimmed milk is used as a binder, the pellet 35 will be rendered more resistant to water, and therefore it will dissolve at a relatively slower rate. If casein glue is used as the binder, the pellet 35 will be rendered even more resistant to water; and therefore it would take an even longer time for such pellet to dissolve. Therefore, pellet 35, depending on the nature of its bonding agent, will dissolve at relative rate to liberate the enzyme accordingly. By weighting the enzyme pellet 35 with metal filings 35B, the pellet is prevented from being flushed out of the tank before the enzymes have had time to do their work, as would be the case with either the liquid or powder type enzyme additive. Also the weighted pellet 35 brings and releases the enzymes where most needed in the sluge 30. The filings 35B used for weight, e.g. iron filings, upon the complete dissolution of the pellet would be themselves subjected to oxidation and therefore would eventually be completely oxidized. Therefore there is not present any danger of the filings 35B accumulating to an extent to cause clogging of the tank.

If desired, such enzyme pellet construction can be sold and distributed in package containing a number of pellets bonded with each of the binding agents above described. Thus immediate and long lasting bacterial action can be attained by depositing one or more of the differently bonded pellets into the tank. It will therefore be apparent that the pellets 35 bonded with animal glue would dissolve rapidly and thereby supply the immediate bacterial action desired, whereas the pellets bonded with animal glue mixed with skimmed milk, and the casein glue would dissolve at proportionately relatively slower rates to supply the continuing and longer lasting bacterial action which will occur after the dissolution of the animal glue bonded pellets. Therefore, periodic disposition of the required bonded pellets at given intervals will always insure positive and active bacterial action within the tank and in the location of the sludge accumulations.

FIG. 3 illustrates a modified form of pellet construction 40. In this form of the invention, a weighted ball or sphere 41 of any suitable metal or material of heavy density defines the nucleus of the pellet 40. Accordingly, a layer 42 of enzyme material is bonded to the nucleus 41. A second layer 43 and succeeding layers 44 of enzyme material are successively bonded one onto the other until the desired size pellet is formed. The ultimate size of the pellet 40 should be one which can readily pass through the drain or soil pipes leading to the tank.

In accordance with this invention the bonding agent employed in the layers of enzyme material for the pellet 40 of FIG. 3 may comprise any of the hereinbefore bonding agents depending on the rate of dissolution desired. Therefore, the layers of pellet 40 may be adhered by animal glue for rapid dissolution, animal glue mixed with skimmed milk for intermediate dissolution, and casein glue for slow dissolution. In operation the pellets of FIG. 3 are similar to that as described for FIG. 2.

The method by which the pellet of FIG. 3 is made is by applying a coat 42A of suitable binding agent to the nucleus or weighted core 41 and thereafter applying to the coated core a layer of enzyme material 42. This can be readily attained either by dipping the core 41 coated with glue 42A in the enzyme material or by rolling the same therein. With the first layer 42 of enzyme material adhered to the coated core, a second layer 42B of suitable bonding agent is applied over the layer 42 of enzyme material and the pellet again rolled or dipped into the enzyme material to pick up its second layer 43 of enzyme. The process is repeated with the third and succeeding layers until the desired sized pellet is formed.

FIG. 4 illustrates still another form of pellet in accordance with this invention. The pellet 50 of FIG. 4 is specifically constructed so that it is capable of enhancing immediate, intermediate and continuing long lasting bacterial action. As shown, pellet 50 comprises a weighted core or nucleus 51 which may consist of a metallic ball or sphere and the like. A first layer or covering 52 of enzyme material is applied to the nucleus, as for example with a casein glue which is relatively resistant to water. A second layer 53 of enzyme material is applied over the layer 52 of the casein bonded enzyme layer 51 and which is adhered thereto by an animal glue mixed with skimmed milk. A bonding agent of this latter type is rendered less resistant to water than the casein bond. On top of second layer 53 a third layer 54 of enzyme material is bonded thereto with a binder of animal glue. This animal glue is the least resistant to water of the binders employed. Thus in use it will be apparent that the weighted pellet 50 will sink to the bottom of the tank, and that the outermost layer 54 thereof will dissolve in a relative short time as plain animal glue is readily dissoluble; thereby liberating the enzymes of the outermost layer directly into the sludge to enhance relatively immediate bacterial action. Subsequently the next or second layer 53 which is more water resistant, as it is bonded by animal glue with skimmed milk, will liberate its enzymes at a relatively slower rate. Finally the layer 52 next to the core, bonded by casein glue, will liberate its enzymes at an even slower rate. In this manner an immediate, intermediate, and longer lasting bacterial action is assured.

To make the pellet 50, the core 51 may be dipped or rolled in a relative fluid mixture of enzyme material and casein glue to form a first layer of enzyme material on the core. After this layer 52 has set, the pellet thus formed is dipped or rolled into a blend of enzyme material and animal glue mixed with skimmed milk to form the second or intermediate layer 53. After this layer 53 has set, the pellet 50 may be again rolled or dipped into a blend of enzyme material mixed with animal glue to build up the third layer 54. It will be understood that the application of each of the layers herein described may be repeated. For example, the pellet may be formed with several applications of each of the respective layers described, i.e. it may have one or more of the applications of casein bonded layers, animal glue with skimmed milk layers, and animal glue layers.

If desired, the pellet 50 may also be made in the same manner as described with the making of pellet 40 of FIG. 3. That is, the layer of binder and enzymes may be separately applied, as described with reference to FIG. 3, rather than applied as a mixture as above described with reference to FIG. 4.

From the foregoing description it will be readily apparent therefrom that the bacteria action within the septic tank will be enhanced because the pellet will sink and locate itself in actual contact with the sludge where the bacterial action is desired. Further because the pellet of this invention sinks, and the enzyme released gradually upon dissolution thereof, the enzymes are not wastefully flushed out of the tank before they have accomplished their purpose, as is the case with either the liquid or powder type enzymes heretofore employed. Also by proper combination of the variable water resistant pellets as described with reference to FIGS. 2 and 3, or by use of the pellet of FIG. 4, an immediate, intermediate, continuing and long lasting bacterial action can be attained at the location in the tank where it is rendered most effective. From the foregoing it will be noted that an important aspect of this invention is to provide a pellet having a density or mass sufficient to assure its sinking to the bottom of the tank.

While the instant invention has been disclosed with reference to several embodiments and methods of making the same, it is to be appreciated that the invention is not to be taken as limited to all of the details thereof as modifications and variations thereof may be made without departing from the spirit or scope of the invention.

What is claimed is:

1. An enzyme pellet construction for enhancing the decomposition of solid waste collecting at the bottom of a septic tank comprising an enzyme containing material, a water soluble binder for maintaining said enzyme containing material in pellet form, and means disposed within said pellet form for weighting said pellet form to provide said pellet form with a mass sufficient to assure its sinking to the bottom of the tank and to maintain the same thereat where said pellet form is rendered most effective until totally consumed.

2. An enzyme pellet construction for use in a septic tank and the like comprising an enzyme containing material, a soluble binder for maintaining said enzyme containing material in pellet form, and means for weighting said enzyme pellet so that the same sinks to the bottom of a septic tank when used, said means for weighting said pellet comprises metallic filings blended with said enzyme containing material of said pellet.

3. An enzyme pellet construction for use in a septic tank and the like comprising an enzyme containing material, a soluble binder for maintaining said enzyme containing material in pellet form, and means for weighting said enzyme pellet so that the same sinks to the bottom of a septic tank when used, said weighted means comprises a metallic core.

4. An enzyme pellet construction for use in the decomposition of the solid waste in a septic tank comprising a weighted core, a first layer of enzyme containing material, a water resistant binding agent for adhering said first layer of enzyme material to said core, a second layer of enzyme material covering said first mentioned layer, an intermediate water resistant binding agent for adhering said second layer to said first layer of enzyme material and third layer of enzyme containing material, covering said second layer, and a relatively water soluble binding agent adhering said third layer to said second layer so that said pellet is formed of layers of enzyme containing material having varying rates of dissolution, said core being formed of a material for imparting to said pellet construction a mass sufficient to assure the sinking of said pellet to the bottom of a septic tank and to retain said pellet construction on the bottom of said tank where it is rendered most effective until consumed.

5. An enzyme pellet construction for use in enhancing bacterial action within a septic tank and the like comprising a metallic core, a first layer of enzyme containing material bonded by a casein glue to said core, a second layer of enzyme material bonded by an animal glue with skimmed milk covering said first layer whereby said second layer is rendered less resistant to water than the first layer, and a third layer bonded by animal glue to said second layer whereby said third layer is rendered less resistant to water than either said second and first layer so that in use said pellet attains both immediate and long lasting bacterial action within the tank.

6. The invention as defined in claim 3 wherein said enzyme containing material is disposed in superimposed layers one on the other onto said core, and a binding agent for adhering one layer to the next.

7. The invention as defined in said claim 6 wherein said binding agent comprises a water soluble animal glue.

8. The invention as defined in claim 6 wherein said binding agent comprises an animal glue combined with skimmed milk for increasing the resistance of said agent to water and thereby retard the dissolution rate of said enzyme material.

9. The invention as defined in claim 6 wherein said agent comprises a water resistant casein glue.

10. The invention as defined in claim 6 wherein the binding agents between successive layers of said enzyme containing material have varying rates of dissolution in water so that the liberation time of the enzyme material in the respective layers vary with respect to one another.

11. A method of making enzyme pellets comprising the steps of taking a weighted core, and forming thereon successive layers of enzyme containing material.

12. A method of making enzyme pellets comprising the steps of taking a metallic core, forming thereon successive layers of enzyme containing material, and binding the enzyme material of the respective layers with water soluble non-enzyme digestive binding agent.

13. A method of making weighted enzyme pellets comprising the steps of blending metallic filings with an enzyme containing material, and binding said blend of filings and enzyme containing material with a water soluble, non-enzyme reactive binding agent.

14. A method of making enzyme weighted pellets comprising the steps of taking a metallic core, forming thereon successive layers of enzyme containing material, and binding the enzyme material of the respective layers with a binding agent having relative rates of dissolution so that in use the time required for each of said layers of enzyme material to go in solution varies with respect to one another.

15. A method of enhancing the bacterial action to enhance the decomposition of the solid wastes in a septic tank comprising the steps of depositing weighted pellets of an enzyme material into the waste line leading to the tank so that said pellet will sink to the bottom of the tank upon its introduction into said tank to settle in said wastes, and controlling the rate of dissolution by the nature of the binding agent employed therein of said pellet in its settled position within said waste at the bottom of said tank.

16. A method of enhancing the bacterial action to enhance the decomposition of solid wastes in a septic tank comprising the steps of depositing weighted pellets of an enzyme containing material into a waste line leading to the tank so that said pellet sinks to the bottom of the tank upon its introduction thereof into said tank to lodge directly in the waste therein, and controlling the rate of dissolution by the nature of the binding agent employed in said pellets so that portions of the enzyme pellets go into solution immediately whereas dissolution of other portions of the pellets are retarded from going immediately into solution so as to attain both immediate and long lasting bacterial action within the tank and within the waste where most desired.

17. A method of enhancing the bacterial action to enhance the decomposition of solid wastes in a septic tank comprising the steps of depositing a weighted pellet formed of an enzyme containing material into a waste line leading to a septic tank so that said pellet sinks to the bottom of the tank upon its introduction thereinto to lodge directly on the waste therein, and controlling the dissolution thereof by the nature of the binding agent employed therein so that a portion of said enzyme pellet goes into solution immediately whereas dissolution of other portions thereof are retarded from going into solution so as to attain both immediate and long lasting bacterial action at the bottom of tank where the waste lies.

18. A method of constructing a weighted enzyme pellet comprising the steps of making a blend of enzyme containing material and a bonding agent, applying said blend to a metallic core, permitting said blend of enzyme containing material and bonding agent to set on said core, and repeating the foregoing step until the desired size of said pellet is reached.

19. The method of constructing a weighted enzyme pellet capable of enhancing immediate and long lasting bacterial action within a septic tank comprising the steps of making separate and distinct blend or mixture of enzyme containing material with a relatively water soluble glue, intermediate water soluble glue, and a relatively water resistant soluble glue, taking a weighted core and applying thereto a first layer of said blend containing enzyme material and said water resistant glue, permitting said layer to set on said core, applying to said first layer a second layer comprising said blend composed of said enzyme material and said intermediate water soluble glue, permitting said second layer to set, applying a third layer comprising said blend of enzyme material and said relatively water soluble glue to said second layer, and permitting said third layer to set.

References Cited by the Examiner
UNITED STATES PATENTS

| | | | |
|---|---|---|---|
| 2,458,163 | 1/1949 | Hays | 210—116 |
| 2,642,376 | 6/1953 | Gale et al. | 195—63 |
| 2,809,933 | 10/1957 | Halvorson | 210—116 |
| 2,810,229 | 10/1957 | Allyn. | |
| 3,069,327 | 12/1962 | Eldridge et al. | 195—63 |
| 3,115,404 | 12/1963 | Carney | 71—6 |

A. LOUIS MONACELL, *Primary Examiner.*

ABRAHAM H. WINKELSTEIN, *Examiner.*